US012731701B2

(12) United States Patent
Le Gall et al.

(10) Patent No.: US 12,731,701 B2
(45) Date of Patent: Sep. 8, 2026

(54) PLATFORM AND PLATFORM SYSTEM FOR NUCLEAR POWER PLANT

(71) Applicant: FRAMATOME, Courbevoie (FR)

(72) Inventors: Lionel Le Gall, Villeurbanne (FR); Jérémy Reis, Beynost (FR); Christophe Jankowiak, Aix en Provence (FR); Jaâfar Majd, Marseilles (FR)

(73) Assignee: FRAMATOME, Courbevoie (FR)

( * ) Notice: Subject to any disclaimer, the term of this patent is extended or adjusted under 35 U.S.C. 154(b) by 696 days.

(21) Appl. No.: 17/914,450

(22) PCT Filed: Mar. 24, 2021

(86) PCT No.: PCT/EP2021/057576

§ 371 (c)(1),
(2) Date: Sep. 26, 2022

(87) PCT Pub. No.: WO2021/191279

PCT Pub. Date: Sep. 30, 2021

(65) Prior Publication Data

US 2023/0162877 A1 May 25, 2023

(30) Foreign Application Priority Data

Mar. 26, 2020 (FR) ....................................... 2002974

(51) Int. Cl.
*G21D 1/02* (2006.01)
*E04G 1/15* (2006.01)

(52) U.S. Cl.
CPC ......... *G21D 1/02* (2013.01); *E04G 2001/157* (2013.01)

(58) Field of Classification Search
CPC ........ E04G 2001/157; E04G 2001/242; E04G 21/04; G21C 19/18; G21C 19/20; G21C 19/02; G21C 19/32; G21D 1/02
See application file for complete search history.

(56) References Cited

U.S. PATENT DOCUMENTS 3,039,949 A * 6/1962 Newton ................. G21C 19/16
976/DIG. 257
3,744,593 A * 7/1973 Jones ..................... G21C 19/02
187/244

(Continued)

FOREIGN PATENT DOCUMENTS

CH 705953 A2 6/2013
CN 203820313 U 9/2014

(Continued)

OTHER PUBLICATIONS

International Search Report for PCT/EP2021/057576.
Corresponding Search Report for FR2002974.

*Primary Examiner* — Kyle J. Walraed-Sullivan
(74) *Attorney, Agent, or Firm* — Davidson Kappel LLC

(57) ABSTRACT

A platform for a nuclear power plant is configured to span a pool (4) of a nuclear power plant by being movable along two parallel rails (6) arranged on either side of the pool (4). The platform comprises at least one platform module (16) having a module floor (18) defining at least part of a platform floor (14) and two guide assemblies (20) for mating with rails (6) to guide the platform along said rails (6). Each platform module is expandable to vary the spacing between the two guide assemblies (20) of the platform module (16), the two guide assemblies (20) being close together in a storage configuration and far apart in a service configuration.

18 Claims, 5 Drawing Sheets

(56) References Cited

U.S. PATENT DOCUMENTS 3,817,348 A * 6/1974 Jones .................... G21C 19/02 376/310
4,824,633 A * 4/1989 Ichikawa ............... B25J 9/1676 376/268
4,991,280 A * 2/1991 Reimer ................ G21C 19/207 29/402.06
5,061,432 A * 10/1991 Matusz .................. G21C 19/02 376/260
5,085,824 A * 2/1992 Busch .................... G21C 19/20 376/268
5,301,770 A * 4/1994 Regan ....................... E04G 3/30 182/128
5,369,676 A * 11/1994 Ortega ................... G21C 19/10 376/271
2003/0156676 A1* 8/2003 Colditz .................. G21C 19/20 376/260
2003/0178253 A1* 9/2003 Tatge ...................... E04G 5/061 182/132
2003/0227993 A1* 12/2003 Pence .................... G21C 19/20 376/260
2005/0013401 A1* 1/2005 Markling ............... G21C 17/00 376/263
2005/0238130 A1* 10/2005 McCann ................ G21C 17/00 376/260
2005/0265510 A1* 12/2005 Jennings ................ G21C 19/00 376/260
2008/0159463 A1* 7/2008 Ortega ................... G21C 19/20 376/269
2008/0302605 A1* 12/2008 St-Germain ............ E04G 1/362 182/223
2010/0020914 A1* 1/2010 Matsumoto ............... E04G 1/36 376/260
2019/0277043 A1* 9/2019 Lolle ..................... B66C 23/166
2023/0227130 A1* 7/2023 Hooghoudt ............. B63B 25/00 182/141

FOREIGN PATENT DOCUMENTS

JP 2011196903 A * 10/2011
WO WO-2010118481 A2 * 10/2010 ............. B66F 11/04

* cited by examiner

PLATFORM AND PLATFORM SYSTEM FOR NUCLEAR POWER PLANT

The present disclosure relates to a platform for nuclear power plants, in particular for the maintenance of a nuclear reactor.

BACKGROUND

In a nuclear power plant, the nuclear reactor is immersed in the water of a pool comprising a reactor pool housing the nuclear reactor itself, and a storage pool for the storage and handling of fresh nuclear fuel assemblies prior to their insertion into the core of the nuclear reactor and of spent nuclear fuel assemblies after their removal from the nuclear reactor.

An overhead crane spanning the pool is movable along rails for lifting and moving nuclear fuel assemblies, including storing fresh fuel assemblies in the storage pool, transferring fresh fuel assemblies from the storage pool to the nuclear reactor, and transferring spent fuel assemblies from the nuclear reactor to the storage pool.

The crane can be equipped with a walkway to accommodate operators, for example to allow them to reach above the pool and carry out maintenance on the nuclear reactor and/or on new or irradiated nuclear fuel assemblies.

A movable walkway can be provided separate and apart from the crane, the walkway also being movable along rails, either the same rails as the crane or dedicated rails, the walkway spanning the pool and being intended to accommodate operators to enable them to get above the pool to carry out maintenance operations.

SUMMARY

However, this requires the provision of a movable walkway in addition to the overhead crane, which takes up some of the relatively small space available around the pool, and which is used for example to store equipment required for the operation of the nuclear reactor or for routine maintenance operations carried out while the nuclear reactor is in operation.

One of the purposes of the present disclosure is to provide a platform system comprising a movable platform above the pool of a nuclear power plant, which facilitates the operation of the nuclear reactor.

To this end, the present disclosure provides a platform configured to span a pool of a nuclear power plant with being movable along two parallel rails disposed on either side of the pool, the platform having a platform floor for operator traffic and/or equipment storage, the platform comprising at least one platform module, each platform module having a module floor defining at least a portion of the platform floor and two guide assemblies, each guide assembly being configured to mate with a respective one of said rails for guiding the platform along said rails, each platform module being extendable so as to vary the spacing between the two guide assemblies of the platform module, the two guide assemblies being moved towards each other in a storage configuration and away from each other in a service configuration.

According to particular embodiments, the platform comprises one or more of the following features taken individually or in any combination that is technically possible:

- each platform module comprises a main part, which has a main plate carried by a main structure, and at least one extension part which comprises an extension plate and guide assembly carried by an extension structure slidably mounted relative to the main structure to move from the storage configuration to the service configuration;
- when changing from the service configuration to the storage configuration of each platform module, the extension plate of each extension part slides onto the main plate;
- the extension plate of each extension part is mounted on the extension structure so that the extension structure retracts under the main plate, the extension plate passing over the main plate;
- each platform module comprises two extension parts, the main part being located between the two extension parts when the platform module is in the service configuration;
- the extension structure of each extension part comprises at least one extension beam slidably mounted on a main beam of the main structure;
- each extension beam is telescopically mounted on the corresponding main beam;
- each platform module comprises at least one actuator assembly, each actuator assembly comprising an actuator and a transmission configured to move the platform module from the storage configuration to the service configuration and vice versa;
- each platform module comprises at least one actuator for driving the platform module along the rails;
- the platform comprises at least two platform modules, in particular exactly two platform modules, configured to be arranged side by side and assembled to form the platform.

The present disclosure also relates to a platform system comprising a platform as defined above and a freight container, the platform being configured for storage in the freight container, each platform module being in a storage configuration.

In a particular embodiment, the platform comprises at least two platform modules, which are intended to be stored in a storage configuration in the container by being stacked on top of each other or on top of each other.

BRIEF SUMMARY OF THE DRAWINGS

The present disclosure and its advantages will become apparent upon reading the following description, given only as a non-limiting example, referring to the attached drawings, in which.

DETAILED DESCRIPTION

Figure 1:
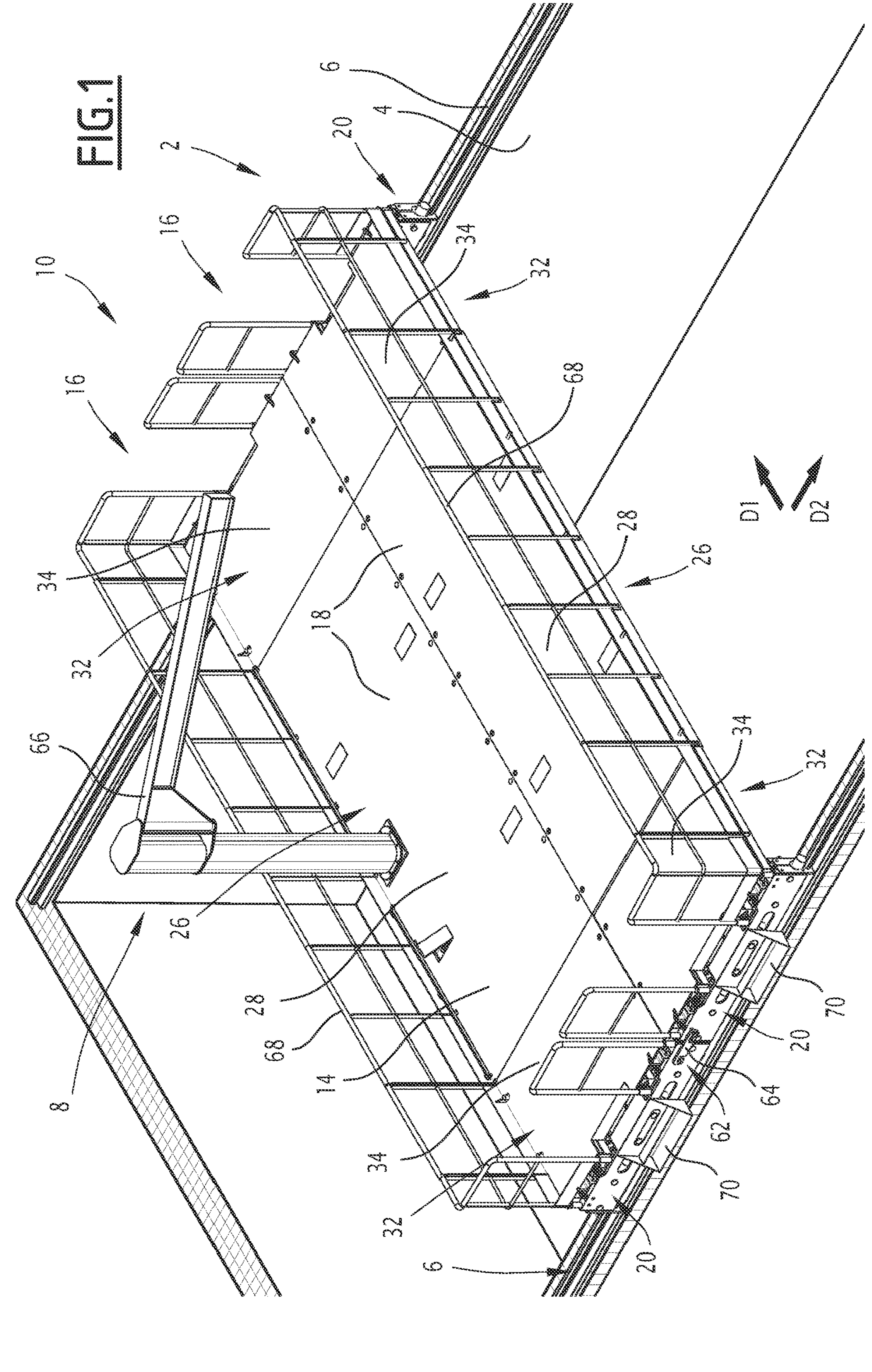
FIG. 1 is a perspective view of a platform installed above a pool in a nuclear power plant.
Figure 2:
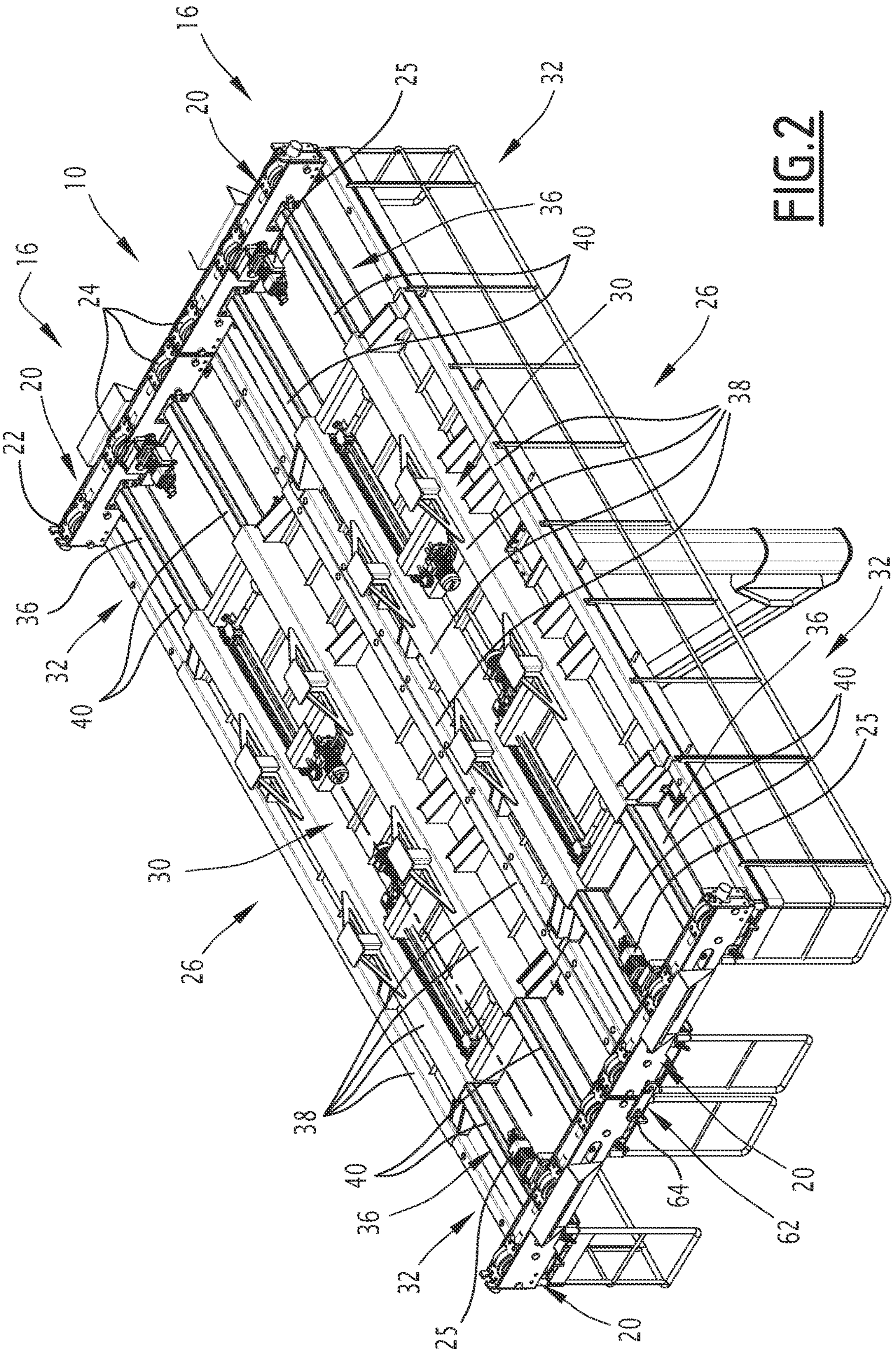
FIG. 2 is a perspective view of the platform showing the underside of the platform.

As shown in FIG. 1, a nuclear power plant 2 has a pool 4 containing water in which a nuclear reactor (not shown) is immersed. The pool 4 comprises, for example, a reactor basin accommodating the nuclear reactor and/or a storage basin equipped to receive new and/or irradiated nuclear fuel assemblies.

The pool 4 is surrounded by a slab which, on the edges of the pool 4, is provided with two parallel rails 6 on either side of the pool 4.

A platform system 8 comprises a platform 10 that spans the pool 4 and is movable along the two rails 6. The platform 10 is for example placed on the rails 6, which in this case support and guide the platform 10 along the rails 6.

The platform 10, which is movable along the rails 6, can be placed at a selected location above the pool 4. The platform 10 is for example configured to extend over the reactor basin and/or storage basin.

The rails 6 are, for example, support and guide rails for an overhead crane (not shown) intended for lifting nuclear fuel assemblies. Alternatively, such a crane is guided along other rails, separate from rails 6 associated with the platform 10.

The two rails 6 are spaced apart in a first direction D1 and extend in a second direction D2 perpendicular to the first direction D1. The space between the two rails 6 is for example between 8 m and 12 m.

Platform 10 is deployable. It has a service state (FIG. 1) in which it is suitable for straddling the pool 4 guided by the rails, and a transport state (FIG. 5) in which the platform 10 is suitable for storage in a freight container 12 of the platform system 8.

A "freight container" here means a container of the type "maritime freight container" or "multimodal freight container", as defined in particular by the ISO 668 standard or the ISO 1496 standard. The most common freight containers are usually 20 feet, 30 feet or 40 feet long. A freight container is typically about 10 feet (about 3.048 m) wide and about 10 feet (about 3.048 m) high.

The freight container 12 of the platform system 8 is advantageously 20 feet long (about 6.096 m)

As can be seen in FIG. 1, the platform 10 has a platform floor 14 for accommodating operators and/or for storing equipment. Operators can use the platform 10 to position themselves above the pool 4 to carry out maintenance operations on the nuclear reactor and/or on nuclear fuel assemblies.

The platform 10 configured to be stored in a 20-foot freight container 12 can be stored and transported in a compact manner, while being able to straddle the pool 4 with a platform floor 14 having an area large enough to accommodate operators and/or to store equipment.

Storing equipment on the platform floor 14 means that this equipment does not need to be stored around the pool 4, limiting the congestion of that area, in particular when the nuclear reactor is undergoing maintenance.

The platform floor 14 extends along the first direction D1 and the second direction D2. The platform floor 14 is substantially parallel to the plane defined by the first direction D1 and the second direction D2.

The platform 10 comprises at least one platform module 16, each platform module 16 having a module floor 18 defining at least part of the platform floor 14.

The platform 10 comprises for example at least two platform modules 16 configured to be arranged side by side and connected to form the platform 10. The platform modules 16 are arranged side by side in the second direction D2. Each platform module 16 defines a section of the platform 10 along the second direction D2, i.e. the direction of extension of the rails 6.

When the platform modules 16 are arranged side by side, their module floors 18 together define the platform floor 14. In particular, each platform module 18 defines a section of the platform 14 along the second direction D2, i.e. the direction in which the rails 6 extend.

The platform 10 comprises for example exactly two platform modules 16 arranged side by side and paired. The module floor 18 of each platform module 16 thus forms approximately half of the platform floor 14.

The module floor 18 of each platform module 16 has, in the second direction D2, a dimension of, for example, between 2.50 m and 3.00 m. This facilitates the storage of the platform module 16 in a freight container 12.

In the service state of the platform 10 (FIG. 1), the platform modules 16 are assembled in such a way that they move together along the rails 6. In the transport state (FIG. 5), the platform modules 16 are separated for storage in the freight container 12.

Each platform module 16 has two guide assemblies 20. Each guide assembly 20 is configured to mate with a respective one of the two rails 6, to guide the platform module 16 along the rails 6. Preferably, each guide assembly 20 is configured to rest on the corresponding rail 6. The rails 6 guide, and possibly support, each platform module 16.

Each guide assembly 20 comprises, for example, a frame 22 on which wheels 24 are rotatably mounted, by means of which the guide assembly 20 rolls on the corresponding rails 6 when the platform module 16 is placed on the rails 6.

Optionally, each guide assembly 20 comprises a drive actuator 25 arranged to propel the guide assembly 20 along the corresponding rail 6.

The drive actuator 25 is for example a hydraulic motor or an electric motor.

The drive actuator 25 is for example configured to rotate at least one of the wheels 24 of the guide assembly 20

The two guide assemblies 20 of each platform module 16 are spaced apart in the first direction D1.

Each platform module 16 has a storage configuration and a service configuration. The storage configuration corresponds to the transport state of the platform 10 and the service configuration corresponds to the service state of the platform 10.

Each platform module 16 is expandable along the first direction D1 from the storage configuration to the service configuration.

In the storage configuration, the two guide assemblies 20 are close together along the first direction D1, and in the service configuration, the two guide assemblies 20 are spaced apart along the first direction D1.

In the storage configuration, the spacing between the two guide assemblies 20 is strictly less than that between the two rails 6, and in the service configuration, the spacing between the two guide assemblies 20 corresponds to that between the two rails 6, so that the guide assemblies 20 can mate with the two rails 6.

In the storage configuration, each platform module 16 has a length (taken along the first direction D1 corresponding to the direction along which the guide assemblies 20 are spaced apart), which is strictly less than the length available within the freight container 12. This available length is approximately 5.90 m for a 20-ft freight container 12.

Furthermore, each platform module 16 has a width (taken in the second direction D2 corresponding to the direction of movement of the guide assemblies 20 along the rails 6) which is strictly less than the width available inside the freight container 12. This available length is approximately 2.35 m for a freight container 12.

This allows each platform module 16 to be stored in the freight container 12, and the platform modules 16 to be stacked on top of each other.

Each platform module 16 comprises a main portion 26, comprising a main plate 28 carried by a main structure 30, and at least one extension part 32, each extension part 32 comprising an extension plate 34 and one of the guide assemblies 20 carried by an extension structure 36.

Each extension structure 36 is slidably mounted in the first direction D1 on the main structure 30 so as to change the spacing between the two guide assemblies 20.

Each extension structure 36 is slidably mounted relative to the main structure 30 between a retracted position, corresponding to the storage configuration of the platform module 16, and an extended position, corresponding to the service configuration of the platform module 16.

In the service configuration, the main plate 28 and each extension plate 34 each form a respective part of the module floor 18.

Each extension structure 36 carries a guide assembly 20, so that movement of the extension structure 36 relative to the main structure 30 changes the spacing between the two guide assemblies 20.

In the retracted position of the extension structure 36, the guide assembly 20 carried by the extension structure 36 is drawn back against the main part 26. In the extended position of the extension structure 36, the guide assembly 20 carried by the extension structure 36 is moved away from the main part 26.

Each platform module 16 comprises, for example, two extension parts 32 located on either side of the main part 26 along the first direction D1, each extension part 32. In the storage configuration, both extension structures 36 are in their retracted positions, and in the service configuration, both extension structures 36 are in their extended positions.

In another embodiment, each platform module 16 has a single extension part 32, one of the two guide assemblies 20 being carried by the extension structure 36 of that extension part 32 and the other being fixedly mounted to the main structure 30. The extension structure 36 is then arranged to extend to one side of the main part 26, with the guide assembly 20 carried by the main part 26 located on the opposite side of the main part 26.

The main structure 30 comprises for example at least one main beam 38 extending in the first direction D1. The main structure 30 comprises, for example, a plurality of parallel main beams 38 extending in the first direction D1. The main structure 30 here comprises four main beams 38.

Each extension structure 36 has for example at least one extension beam 40 slidably mounted along the first direction D1 on the main structure 30.

Each extension beam 40 is for example telescopically mounted on a main beam 38. The guide assembly 20 of the extension part 32 is carried at the end of each extension beam 40 that is opposite the main part 26.

In one example embodiment, the extension structure 36 has a respective extension beam 40 associated with each main beam 38 and slidably mounted on that main beam 38, in particular telescopically mounted on that main beam 38.

The main structure 30 here comprises four main beams 38, including two central main beams 38 located between two lateral main beams 38. For example, the central main beams 38 have a larger cross-section than the lateral main beams 38. Each extension structure 36 has four extension beams 40, each extension beam 40 being telescopically mounted on a respective main beam 38.

Figure 3:
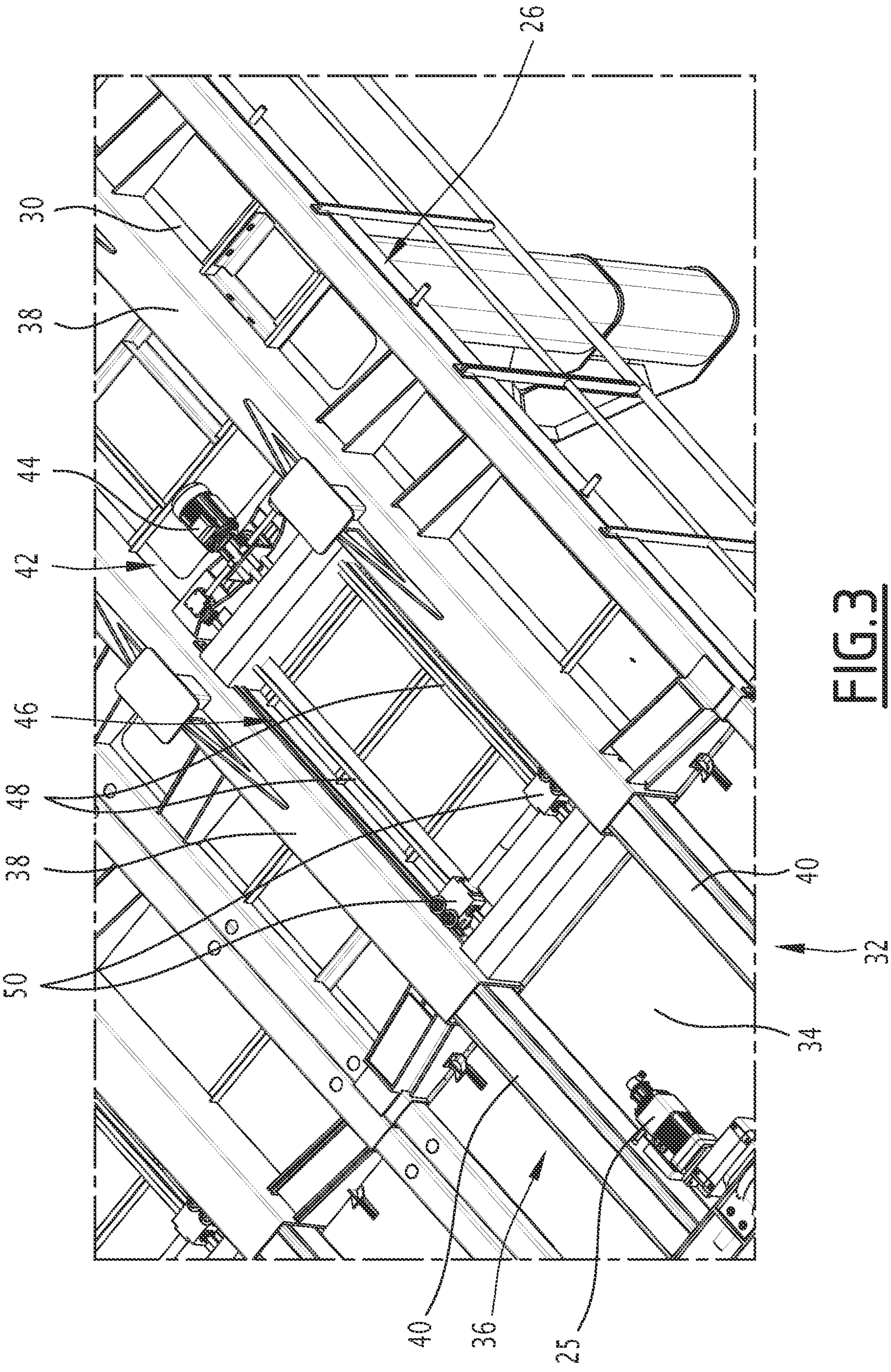
FIG. 3 is a detailed view of FIG. 2 showing a platform actuator assembly.

As can be seen in FIG. 3, each platform module 16 advantageously has at least one actuator assembly 42 for moving the platform module 16 from the storage configuration to the service configuration, and vice versa.

Each actuator assembly 42 is configured to move the extension structure 36 of at least one extension part 32 between its retracted position and its extended position.

In one example embodiment, each platform module 16 has a respective actuator assembly 42 associated with each extension part 32, which actuation assembly 42 is configured to move the extension structure 36 of that extension part 32 between its retracted position and its extended position.

In another example embodiment, each platform module 16 has a single actuator assembly 42 configured to move the extension structures 36 of two extension parts 32 between their respective retracted and extended positions.

Each actuator assembly 42 comprises an actuator 44 and a transmission 46 configured to transmit movement generated by the actuator 44 to each extension structure 36 operated by that actuator assembly 42.

The actuator 44 of each actuator assembly 42 is for example a motor, in particular an electric motor.

The transmission 46 of each actuator assembly 42 comprises, for example, at least one screw/nut assembly comprising a screw 48 and a nut 50, the screw 48 extending in the first direction D1, and the actuator 44 being coupled to one of the screw 48 and the nut 50 to rotate it so as to move the other in translation.

In one example embodiment, the screw 48 of each screw/nut assembly is rotatably mounted on the main structure 30, and the nut 50 is mounted on the extension structure 36, with rotation of the screw 48 caused by the actuator 44 causing the nut 50 to move along the screw 48 and thereby sliding the extension structure 36 relative to the main structure 30.

In an example embodiment in which the extension part 32 comprises at least two extension beams 40, the transmission 46 comprises for example two screw/nut assemblies, each interposed between the actuator 44 and a respective extension beam 40 for driving that extension beam 40 in translation, both extension beams 40 thus being driven in translation by means of the same actuator 44.

Each extension plate 34 is configured to extend the main plate 28 by being supported by the corresponding extension structure 36. In the service configuration, each extension plate 34 extends between the guide assembly 20 carried by the extension part 36 and the main plate 38.

Figure 4:
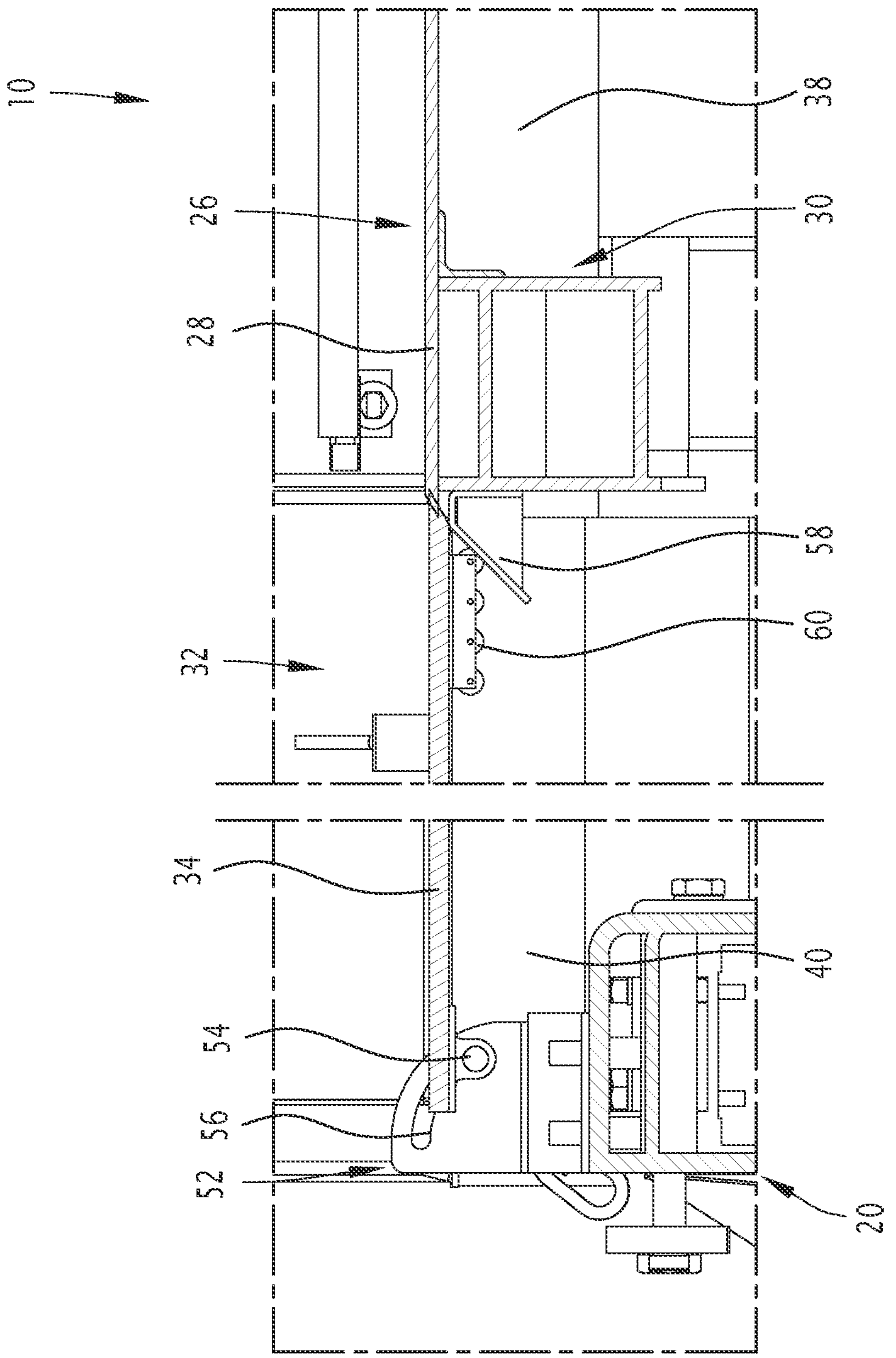
FIG. 4 is a schematic cross-section of the platform showing an extension part of a platform module.

As shown in FIG. 4, each extension plate 34 is for example mounted on the corresponding extension structure 36 so as to pass over the main plate 28 when the extension structure 36 is retracted, with the extension structure 36 passing under the main plate 28.

To this end, each extension plate 34 has its end adjacent to the guide assembly 20 linked to the extension structure 36 or to the frame 22 of the guide assembly 20 by at least one connection 52 so as to allow upward movement of the extension plate 34 relative to the extension structure 36.

In one embodiment, the link 52 is formed by a slider 54 slidably received in a guide 56 having a lower end and an upper end. When the slider 54 is at the lower end, the extension plate 34 is placed on the extension structure 36. When the slider 54 is at the top end, the extension plate 34 is vertically spaced away from the extension structure 36.

For example, the guide 56 has an arcuate shape, with the lower end of the guide 56 offset horizontally towards the central portion 28 from the upper end.

The end of each extension plate 34 adjacent to the main plate 28 is simply supported on the corresponding extension structure 36.

When the extension structure 36 is retracted, the end of the extension plate 34 adjacent to the main plate 28 passes over the main plate 28, the other end being able to shift upwards by the linkage 52 configured for this purpose, to facilitate the passage of the extension plate 34 over the main plate 28.

Optionally the platform module 16 has at least one ramp 58 associated with each extension plate 34 and arranged to raise the end of the extension plate 34 adjacent to the main plate 28 above the main plate 28. Each ramp 58 is for example fixed to the main structure 30.

Optionally, the platform module 16 has a rolling device 60 attached to the extension plate 34 and configured to roll on a corresponding ramp 58 to raise the end of the extension plate 34 adjacent to the main plate 28 above the main plate.

Each rolling device 60 comprises rolling elements, such as wheels or rolls or rollers, by means of which the extension plate 34 is supported on the ramp 58.

Returning to FIG. 1, the platform 10 has at least one connecting device 62, each connecting device 62 allowing two adjacent platform modules 16 to be connected, such that the platform modules 16 move together along the rails 6.

Each assembly device 62 comprises, for example, an assembly plate 64 provided with slots receiving assembly rods attached to the platform modules 16. Here the assembly plates 64 are arranged on the side of the guide assemblies 20.

Advantageously, the platform system 8 has removable equipment, which can be detachably mounted on the platform 10.

Advantageously, the platform system 8 comprises a removable lifting tool 66 configured to be mounted on the platform. The lifting tool 66 is, for example, in the form of a jib, having a mast and a boom mounted on the mast.

The platform system has, for example, removable guardrails 68 configured to be mounted on the platform 10 at the periphery of the platform floor 4, possibly leaving access openings for access to the platform from the edge of the pool 4.

The platform system comprises for example one or more removable steps 70. Each step 70 makes it easier for operators to climb onto the platform 10.

Figure 5:
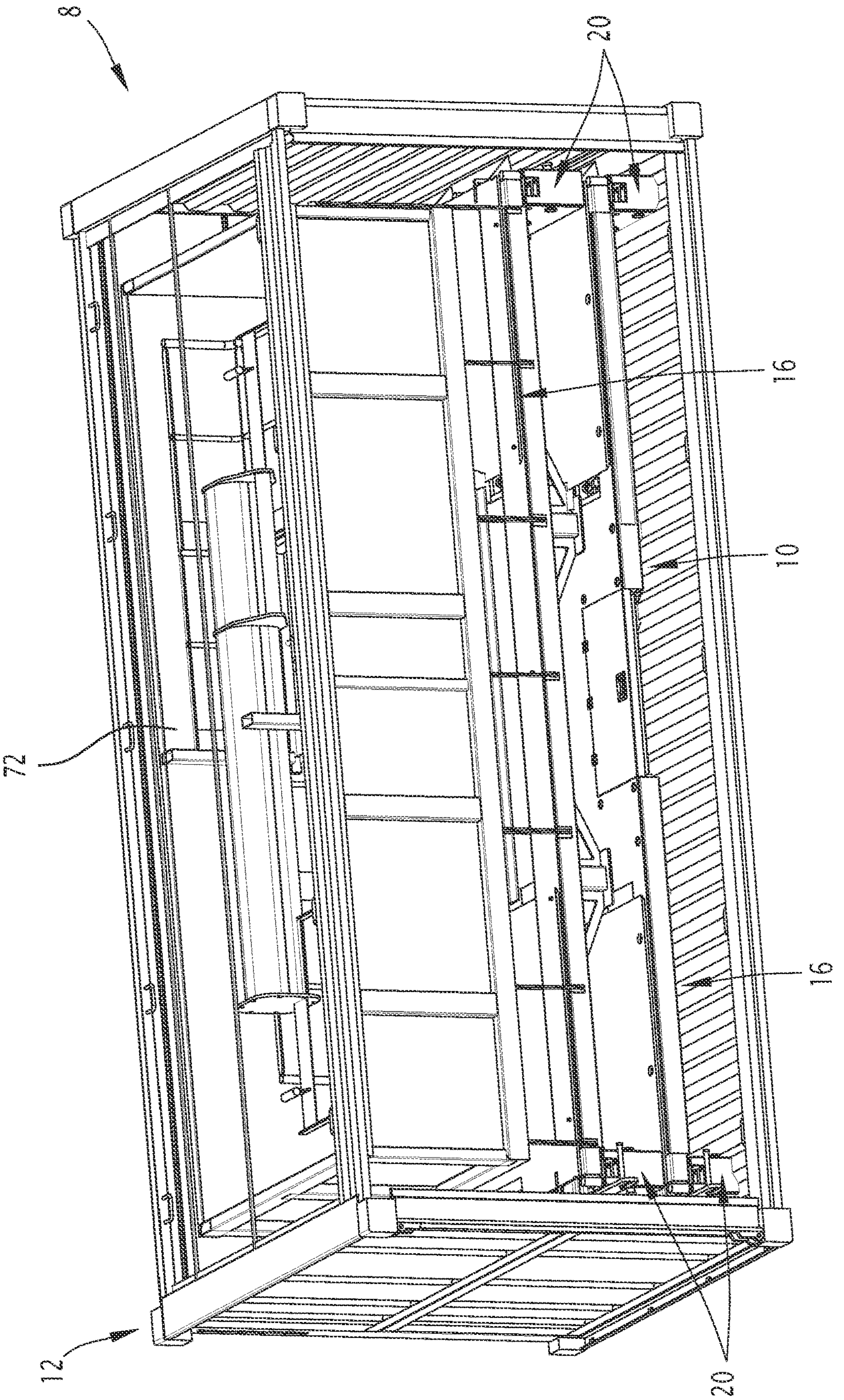
FIG. 5 is a perspective view of a platform stored in a container.

FIG. 5 shows the platform 10 stored in the freight container 12. Two panels of the freight container 12 are omitted to make the platform 10 stored in the container 12 visible.

As illustrated in FIG. 5, in a stored state of the platform, the platform modules 16 are separated, with each platform module 16 being placed in a storage configuration, with each platform module being disposed in the freight container 12.

More specifically, the transport modules 16 are superimposed on each other or on each other.

Advantageously, the platform system 8 comprises a storage plate 72, the storage plate being intended to be inserted inside the freight container 12 by being superimposed with the platform modules 16, and to receive for example removable equipment (lifting tool, guardrail, step(s)) intended to be mounted on the platform modules 16.

During the normal operation of the nuclear reactor, the platform system 8 is not installed and might not be on-site at the nuclear power plant.

When maintenance operations are planned on the nuclear reactor and the operator wishes to have a platform available during these maintenance operations, for example to provide additional storage space and/or to allow operators to reach the top of the pool 4, the platform system 8, comprising the platform 10 in its stored state, stored in the freight container 12, is brought to the site (FIG. 5).

The platform modules 16 in storage configuration are removed from the freight container 12. Each platform module 16 thus has its extension parts 32 in their retracted positions and its guide assemblies 20 in their proximate positions.

Each platform module 16 is then brought into a service configuration, by moving the extension structure 36 of each extension part 32 from its retracted position to its extended position, for example using the associated actuator assembly 42. The guide assemblies 20 are thus spaced apart so that the distance between them corresponds to that between the rails 6.

In so doing, each extension plate 34, initially located on the main plate 28, moves in conjunction with the associated guide assembly 20 and comes to rest adjacent to the main plate 28 on the corresponding extension structure 36.

The platform modules 16 are arranged on the rails 6 and connected to each other by means of the connecting devices 62, thus forming the platform 10.

The platform 10 is then fitted with its removable equipment (lifting tool 66, guardrail 68, step(s) 70) (FIG. 1).

For the dismantling and storage of the platform system 8, the reverse operations are performed.

During a nuclear reactor unit outage, the operation of the nuclear reactor is interrupted, and the operator proceeds to unload spent fuel assemblies, load fresh fuel assemblies, reposition some spent fuel assemblies that are kept in the nuclear reactor, and perform maintenance operations.

During a unit outage, there is usually a lack of space on the slab surrounding the nuclear power plant pool to allow for co-activity and reduce the duration of the unit outage.

The platform system 8 provides the operator with more available floor space during unit outages, allowing that person to optimise the use of maintenance equipment, in particular the overhead crane.

The platform system 8 increases the usable area by partially covering the pool 4 without interfering with unit shutdown operations.

The platform 10 can be installed and dismantled quickly. It is movable along rails 6 to allow access to elements stored at the bottom of the pool, such as fresh or spent fuel assemblies.

The platform system 8 in its disassembled state, when stored in the freight container 12, is compact, which reduces transport and storage costs.

The transport modules 16 with a storage configuration and a service configuration facilitate transport by allowing compact storage, and use, by allowing the platform 10 to be deployed for mounting on the rails 6 with an appropriate spacing between the guide assemblies 20.

The platform 10 in the service state is preferably intended to carry a substantial load, for example for storage of material and/or to provide an additional working surface.

Advantageously, the platform 10 in the service state has a platform floor 14 with a surface area of at least 20 $m^2$, in particular a surface area of at least 30 $m^2$, for example a surface area of approximately 32 $m^2$.

Advantageously, the platform 10 in the service state has a load capacity of at least 400 $kg/m^2$, preferably at least 500 $kg/m^2$, in particular about 600 $kg/m^2$.

Preferably, the platform 10 is designed to rest on the rails 6 of the crane provided for handling the nuclear fuel assemblies. Thus, no modifications to the nuclear power plant are required to allow the use of the platform system 8.

What is claimed is:

1. A platform configured to span a pool of a nuclear power plant with being movable along two parallel rails disposed on either side of the pool, the platform having a platform floor for operator traffic and/or equipment storage, the platform comprising:

at least two platform modules, each platform module having a module floor defining at least a portion of the platform floor and two guide assemblies, each guide assembly being configured to mate with a respective one of said two parallel rails for guiding the platform along said two parallel rails, each platform module being extendable so as to vary a spacing between the two guide assemblies of the platform module, each platform module being configured so the two guide assemblies are moved towards each other in a storage configuration and away from each other in a service configuration, wherein the platform modules are separable from each other and are configured to be transported together in a freight container in a transport state.

2. The platform according to claim 1, wherein each platform module comprises a main part, which has a main plate, carried by a main structure and at least one extension part which comprises an extension plate and guide assembly carried by an extension structure slidably mounted relative to the main structure to move from the storage configuration to the service configuration.

3. The platform according to claim 2, wherein each platform module is configured such that, when moving from the service configuration to the storage configuration of each platform module, the extension plate of each extension part slides over the main plate.

4. The platform according to claim 3, wherein the extension plate of each extension part is mounted on the extension structure such that the extension structure retracts under the main plate with the extension plate passing over the main plate.

5. The platform according to claim 2, wherein the at least one extension part includes two extensions parts such that each platform module comprises two extension parts, the main part being located between the two extension parts in the service configuration of the platform module.

6. The platform according to claim 2, wherein the extension structure of each extension part comprises at least one extension beam slidably mounted on a main beam of the main structure.

7. The platform according to claim 6, wherein each extension beam is telescopically mounted to the main beam.

8. The platform according to claim 2, wherein each platform module comprises at least one actuator assembly, each actuator assembly comprising an actuator and a transmission configured to move the platform module from the storage configuration to the service configuration and vice versa.

9. The platform according to claim 1, wherein each platform module comprises at least one actuator for driving the platform module along said two parallel rails.

10. The platform according to claim 1, wherein the at least two platform modules are configured to be arranged side by side and assembled to form the platform.

11. The platform according to claim 1, wherein the at least two platform modules is exactly two platform modules, configured to be arranged side by side and assembled to form the platform.

12. The platform according to claim 1, wherein the storage configuration corresponds to the transport state of the platform and the service configuration corresponds to a service state of the platform in which the platform is configured for straddling the pool guided by the two parallel rails.

13. The platform according to claim 1, wherein the at least two platform modules are configured to be stacked on top of each other for transportation in the freight container in the transport state.

14. The platform according to claim 1, wherein the at least two platform modules are movable along a length of the two parallel rails in the service configuration.

15. The platform according to claim 14, wherein the two parallel rails are spaced apart in a first direction and extend in a second direction perpendicular to the first direction, the at least two platform modules being movable along the length of the two parallel rails in the second direction in the service configuration.

16. The platform according to claim 15, wherein the at least two platform modules, side-by-side in the service configuration, extend longitudinally in the second direction with one of the two guide assemblies of each platform module being at a first longitudinal end of a respective platform module and mating with one of the two parallel rails and the other of the two guide assemblies of each platform module being at a second longitudinal end of the respective platform module and mating with the other of the two parallel rails.

17. A platform system comprising:

the platform according to claim 1; and a freight container, the platform being configured for storage in the freight container, each platform module being in a storage configuration.

18. The platform system according to claim 17, wherein the at least two platform modules are adapted to be stored in a storage configuration in the freight container by being stacked on top of each other.

* * * * *